Nov. 5, 1968          H. B. WILLIAMS          3,409,101
              SAFETY DEVICE FOR MOTOR VEHICLES
Filed May 31, 1966                       2 Sheets-Sheet 1
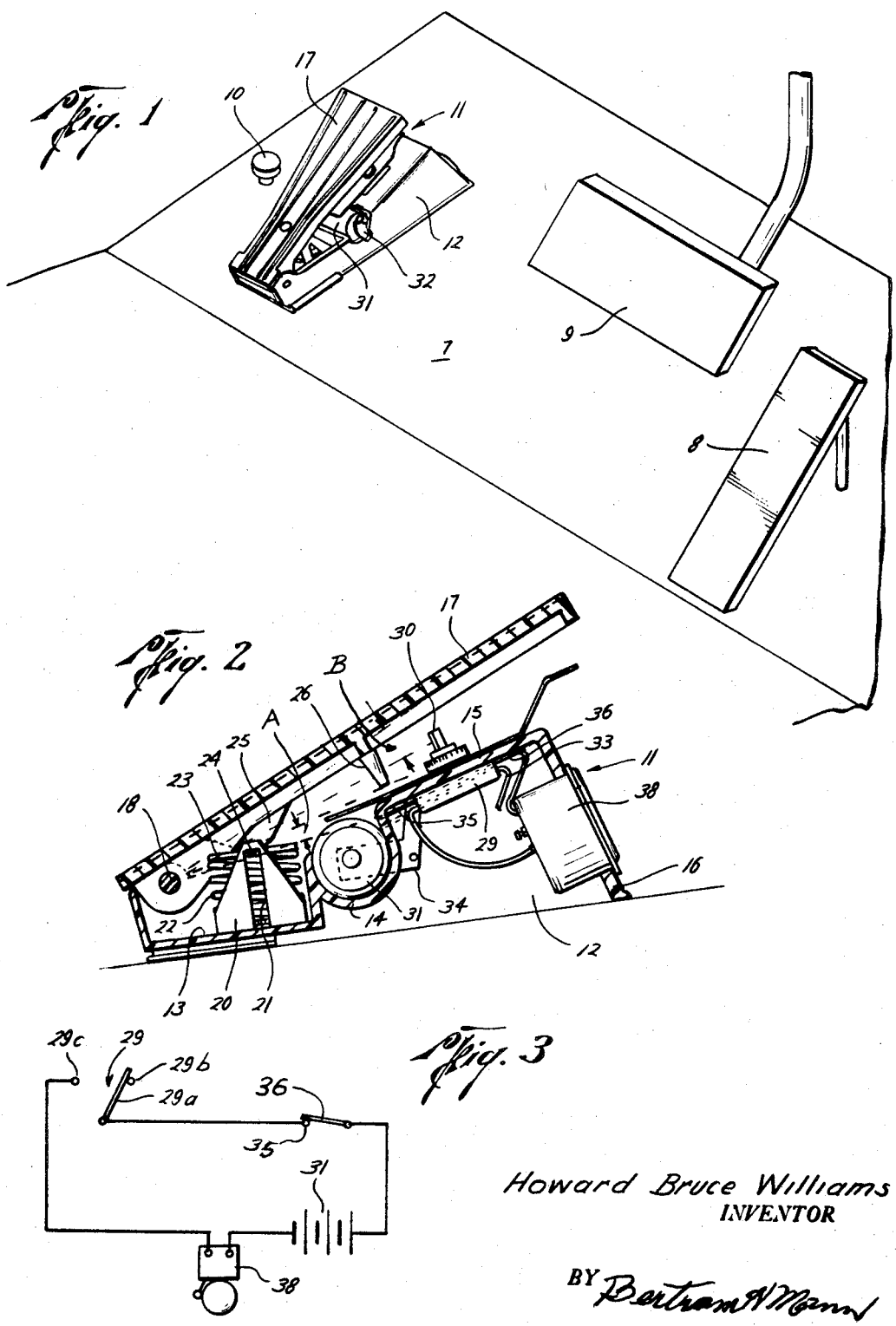
Howard Bruce Williams
INVENTOR
BY Bertram A. Mann
ATTORNEY Nov. 5, 1968  H. B. WILLIAMS  3,409,101
SAFETY DEVICE FOR MOTOR VEHICLES
Filed May 31, 1966  2 Sheets-Sheet 2
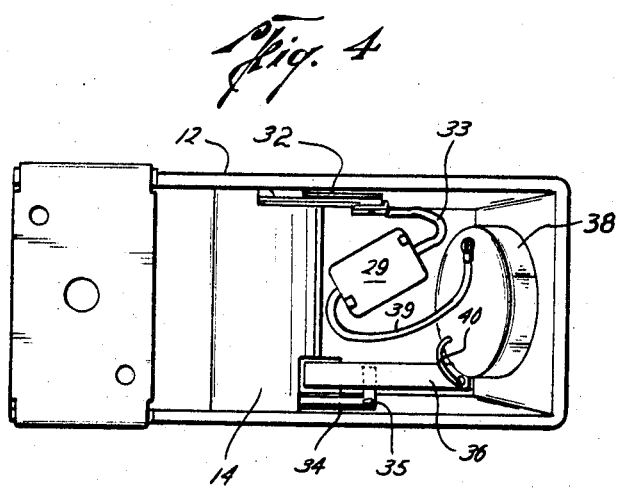
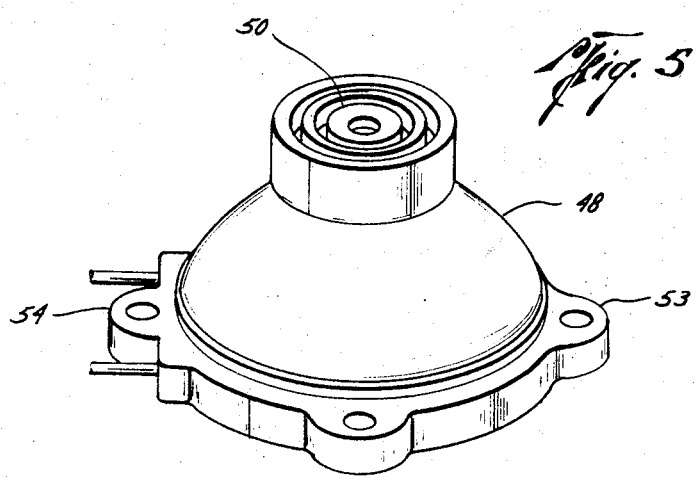
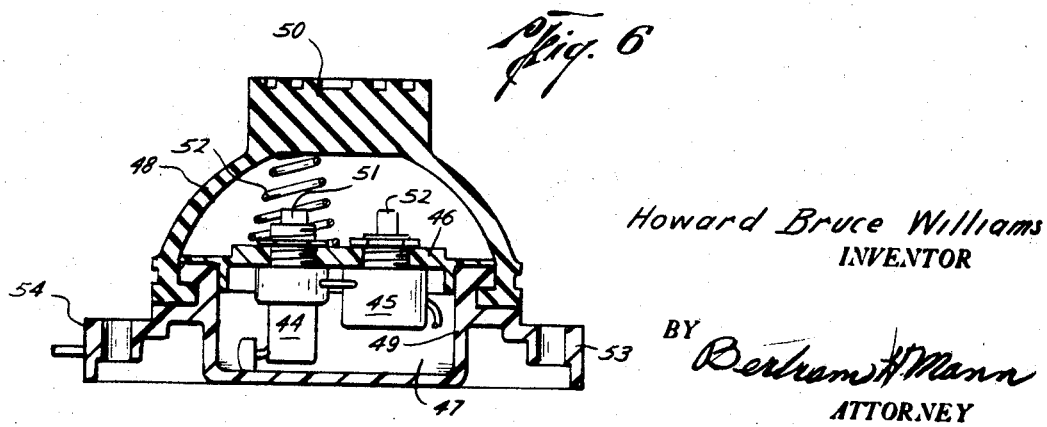
Howard Bruce Williams
INVENTOR
BY Bertram H. Mann
ATTORNEY

3,409,101
SAFETY DEVICE FOR MOTOR VEHICLES
Howard B. Williams, 3212 Aberdeen Way,
Houston, Tex. 77025
Filed May 31, 1966, Ser. No. 553,906
4 Claims. (Cl. 180—82)

ABSTRACT OF THE DISCLOSURE

A foot pedal on the floor of the driver's compartment, upon successive depressions, will (1) activate an indicator switch for giving a signal, such as a buzzing sound, when the driver relaxes his pressure on the pedal, as when he begins to drowse, and (2) deactivates the switch to take it out of action. In one form, at least the indicator switch is enclosed in a flexible wall hood to protect the same against floor and foot dirt.

---

This invention relates to safety devices for motor vehicles and consists particularly in novel means for maintaining the driver of such vehicle in an alert state. More particularly, the invention relates to a novel device which will automatically give an indication, preferably a loud sound, in response to relaxation of the driver's foot.

A large number of motor vehicle accidents result from the driver going to sleep at the wheel, this condition being aggravated, of course, during long drives and drives at night or at other times when the operator is tired. It has been found that if there is an influence tending to cause the driver to maintain pressure on a device by means of the left foot—that is, the foot not used in operating the accelerator pedal—he will tend to stay awake. Of course, the occurrence of a disturbing event, such as a loud sound, also will tend to alert the driver. Previous pedal devices for somewhat similar purposes have embodied switch actuators exposed to grit and dirt on the floor of the driver's compartment as well as on the operator's foot so as to be subject to contamination in a manner which may cause sticking of the actuator and, thus, faulty switch actuation.

Consequently, it is an object of the present invention to provide a simple and inexpensive driver alerting device.

Another object is to provide such a device which requires a conscious effort exerted by the driver through his left foot in order to prevent the giving of a signal.

Still another object is to provide a driver alerting device which creates a signal, preferably a loud or disturbing noise when the driver's foot is unconsciously relaxed —that is, when the alertness of the driver is reduced.

Another object is to provide such a device in the form of a pedal which, upon successive extreme depressions in the same manner, will successively activate and deactivate a signal circuit.

Still another object is to provide a driver alerting device including a normally closed signal control switch and an actuator therefor positioned to be conveniently depressed by conscious action of the operator's foot to open the switch, both the switch and actuator being encased to protect the switch parts.

In accordance with the present invention, a special pedal is provided on the floorboard of the driver's compartment in convenient position for depression by the driver's left foot. The pedal actuates at least one of a pair of series control switches during depression and lifting, the first of which is an "on-off" type circuit or activating switch which, upon successive actuations, will alternately close and open the circuit. The second switch is normally closed and can be opened, to de-energize the signal. The actuators for both switches may be positioned for operation by the same pedal device whereby depression of the pedal to a lesser extent than is necessary to actuate the first switch will de-energize the signal. Thus, the driver can easily activate the circuit by extreme depression of the pedal and, thereafter, must hold the pedal slightly depressed, against a rather stiff spring, to prevent the giving of the alarm signal. To de-activate the switch, it is simply necessary to again fully depress the pedal. At least the normally closed control switch and its actuator are enclosed in a protective casing, preferably having a flexible wall to accommodate pedal movement.

In the accompanying drawings which illustrate the invention,

FIG. 1 is a perspective view showing a portion of the floorboard in the driver's compartment of a motor vehicle;

FIG. 2 is an enlarged, vertical longitudinal section through one form of the safety device, as illustrated in FIG. 1;

FIG. 3 is a diagram showing the electrical circuitry utilized in connection with the device of FIG. 2;

FIG. 4 is a bottom view of the device of FIG. 2;

FIG. 5 is a perspective view showing a modified form of warning device; and

FIG. 6 is a vertical section through the device of FIG. 5.

In FIG. 1 there is shown the left-hand half 7 of the floorboard of a motor vehicle upon which is mounted the usual accelerator pedal 8, brake pedal 9, and light switch 10. Near the switch 10 there is mounted the novel safety device, generally designated 11 and shown in greater detail in FIGS. 2 and 4. This device comprises a base 12 of stout, plastic material including a rear end, generally rectangular depression 13, an intermediate, approximately cylindrical transverse cavity 14, and a forwardly and upwardly inclined top wall 15 which merges with a right angled end wall 16. Pedal 17 is pivoted at 18 between the side walls of rectangular depression 13.

Projecting upwardly from the floor of depression 13 are a pair of lugs 20, only one being shown, each having a slot 21, and between these lugs there is seated a stiff, coiled-type compression spring 22 on which rests a spring cap 23 having diametral guide fingers 24 received in slots 21 and limited in their rotational and upward movements thereby. On the under surface of pedal 17 there are provided knees 25 which rest on spring cap 23. The arrangement is such that pedal 17 is normally maintained in its uppermost position by spring 22. Also depending from the under surface of pedal 17 is a switch actuator finger 26 to be referred to further hereafter.

Mounted on inclined transverse wall 15 of the casing is a canopy-type activating switch body 29 having an actuating pin 30 projecting upwardly therefrom. This switch is of the "on-off" type, that is, it will remain in either its "on" or its "off" position until actuated by an extraneous force. Cylindrical recess 14 provides for mounting a battery 31 which is normally held in position by a pivoted metal arm 32 which also serves to connect one terminal of the battery to "on-off" switch 29 by means of wire 33 (FIG. 4). The other terminal of the battery is connected by an arm 34 to a switch bar 35 secured to the under surface of casing top part 15. A cooperating switch blade spring 36 is also secured, at its right-hand end, to the under surface of casing part 15 and underlies and normally contacts switch bar 35. Contacts 35 and 36 form a momentary control type of switch normally closed. A buzzer 38, or other sound indicator, is mounted in inclined casing front wall 16 and is connected by wires 39 and 40, respectively, to "on-off" switch 29 and the forward end of switch blade spring 36.

FIG. 3 shows the wiring diagram with various elements arranged in series and numbered the same as in FIGS. 2 and 4, although the positions of switches 29 and 35, 36 are reversed. Switch 29, called a canopy or activating switch, is of the conventional push-button "on-off" type in which the actuating pin 30 is normally urged outwardly by a spring and, when successively pushed inwardly, will alternately shift its bridging contact 29a between open and closed contacts 29b and 29c. The actuating relationships between pedal 17 and the two switches 29 and 35, 36 are important. The angular displacement of pedal 17 from its uppermsot position through a first range of movement to its position for opening switch blade spring 36 by means of pin 26 is represented by the angle A. The angle A is less than the angle B representing a second range of pedal movement through which pedal 17 must be depressed in order to actuate switch 29. Thus, extreme depression of pedal 17 is necessary to actuate the activating or canopy switch 29. After switch 29 has been closed, relaxation of the driver's foot sufficiently to permit pedal 17 to fully rise will result in closing of normally-closed switch contacts 35, 36 and sounding of the alerting alarm. It is thus necessary for the driver to maintain sufficient pressure on the pedal to hold switch 35, 36 open in order to avoid the sounding of the alarm. It is this foot pressure needed to depress pedal 17 against spring 22 which, first, tends to prevent dozing of the driver and, second, results in the sounding of the alerting signal alarm in case of unconscious relaxation of driver's foot as occurs when his alertness is reduced sufficiently.

The form in FIGS. 5 and 6 operates the same as that in the first form, but is intended for original equipment installation on a motor vehicle and for connection to a separate horn or buzzer conveniently mounted as under the instrument panel. The canopy or "on-off" activating switch 44 and the normally-closed signalling switch 45, corresponding with switches 29 and 35, 36 in the first form, are mounted on a panel 46 and housed within a chamber 47 beneath the panel. A flexible hood 48 of generally hemispherical form is snugly received about casing 49 and has an upper thickened wall 50 serving as an actuating button or pedal and overlying actuator pins 51 and 52 of the switches 44 and 45. Foot engaging part 50 is urged upwardly by a fairly stiff coiled spring 52. Although actuating pins 51 and 52 are shown as terminating at about the same level, pin 52, which activates the circuit, must be depressed considerably farther than pin 51 so that extreme depression of button part 50 is required respectively to activate and de-activate the signal circuit, while lesser depression of button part 50 is required to open signal switch 44 and prevent giving of the signal. Casing 49 may be secured to the floorboard in the driver's compartment by means of suitable screws or bolts inserted through apertured ears 53 and 54.

The wiring of the form in FIGS. 5 and 6 will be the same as shown in FIG. 3 except that battery 31, ordinarily, will be replaced by a ground and the accessory terminal of the ignition switch, while indicator 38 may be replaced by the horn of the vehicle. If desired, "on-off" activating switch 45 and its actuating means, as 52, may be located outside flexible wall casing hood 48, as, for instance, on the vehicle dashboard. In any case, the normally closed signal control switch and its actuator are fully shielded from floor mat and foot dirt.

Thus, in both forms the safety device, in normal deactivated position, will give no signal whether the pedal or button is released and fully lifted or is depressed and held down. In case the driver feels the need for placing the safety device in operation, he simply presses the pedal or button to its extreme depressed position and then holds the pedal or button sufficiently depressed, against its spring, to prevent closing of the indicator switch. This conscious effort applied through the left foot tends to keep the driver alert. In case he becomes drowsy or otherwise relaxes his foot pressure, the alerting signal will be given. When he wishes to again de-activate the device, he simply again pushes the pedal or button to its extreme depressed position and then releases it fully. Accordingly, the operation is quite simple and can be effected without any more attention to the positioning and action of the foot than is needed in operating the usual light switch. The invention may be modified in various respects as will occur to those skilled in the art, and the exclusive use of all modifications as come within the scope of the appended claims is contemplated.

I claim:

1. A safety device for mounting on the floorboard of a vehicle comprising signal means, a source of electrical energy, a first normally closed switch of the momentary controlled type, a second activating switch of the "off-on" type, an electrical circuit connecting said signal means, said source, and said switches in series, first and second operating plungers, respectively, for said switches, a common pedal actuator for said plungers and conveniently located for depression by the driver's foot, and spring means normally maintaining said pedal actuator in an elevated rest position, said pedal actuator having sequential first and second ranges of depression movement and said plungers being operatively related to said pedal so that initial depression of said actuator through said first and second ranges closes said activating switch and opens said control switch whereupon return of said pedal actuator to said rest position will complete said circuit and energize said signal means and, upon the succeeding depression of said pedal actuator through said first and second ranges, said activating switch will be opened so as to thereby prevent energization of said signal means by said control switch.

2. A safety device as described in claim 1 further including a flexible casing enclosing said switches and said operating plungers to shield the same against floor and foot dirt.

3. A safety device for motor vehicles comprising a first, normally closed switch and a second, activating, "off-on" type switch for mounting on the floor area of the driver's compartment, a driver alerting signal device, actuators for said switches, a flexible-wall, hood-like casing enclosing said switches and said actuators, said casing including a top element for depression by the foot of the vehicle operator and operatively related to said actuators for sequentially actuating said switches during continued depression of said element, spring means normally urging said element toward an outward rest position, a source of electrical energy, and circuit means connecting said first and second switches, said device, and said source whereby said device will be energized upon sequential closing of said second and first switches and may be de-energized either by a succeeding closing of said actuating switch by full depression of said element by the operator's foot or by partial depression of said element by the operator's foot against said spring means to open said first switch.

4. A vehicle safety device as described in claim 3 in which said flexible wall casing is hemispherically shaped and further including a transverse wall extending substantially diametrically across said casing and mounting said switches.

References Cited

UNITED STATES PATENTS

| | | | |
|---|---|---|---|
| 1,919,206 | 7/1933 | Douglas | 200—61.89 X |
| 2,126,878 | 8/1938 | Galli | 180—89 |
| 2,215,985 | 9/1940 | Stankey | 340—279 |
| 2,711,528 | 6/1955 | Glossbrenner | 340—279 |
| 2,738,496 | 3/1956 | Armstrong. | |

A. HARRY LEVY, *Primary Examiner.*